United States Patent Office 3,014,925
Patented Dec. 26, 1961

3,014,925
UNSATURATED MEVALONIC ACID
Bruce O. Linn, Plainfield, and Clifford H. Shunk, Westfield, N.J., assignors to Merck & Co., Inc., Rahway, N.J., a corporation of New Jersey
No Drawing. Filed May 29, 1958, Ser. No. 738,607
2 Claims. (Cl. 260—343.5)

This invention relates to the lactone of 5-hydroxy-3-methyl-2-pentenoic acid, which has the structure:

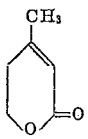

The invention also involves procedures for the production of this lactone. The lactone of the invention has utility as an intermediate for the production of mevalonic acid. The usefulness of mevalonic acid as a nutritional substance is set forth in an article entitled "Isolation of a new Acetate-replacing Factor" by L. D. Wright et al., appearing in J. Am. Chem. Soc., 78, 5273 (1956).

The lactone of the invention may be prepared by adding directly to aqueous sulfuric acid an alkyl ester of 3-hydroxy-3-methyl-5-acetoxypentanoic acid. This is represented by the equation:

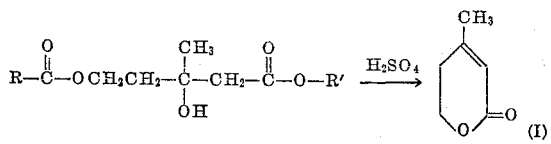

In this equation, R and R' may be any lower alkyl radical, preferably those having up to six carbon atoms and as these radicals are removed to make the desired lactone, it is apparent that their specific choice is immaterial. The pentanoic acid derivative which appears in the above equation may be obtained by the procedure set forth in an article entitled "Synthesis of DL-3,5-Dihydroxy-3-methyl-pentanoic Acid (Mevalonic Acid)" by C. A. Hoffman et al., appearing in J. Am. Chem. Soc., 79, 2316 (1957).

Instead of using sulfuric acid, it is possible to use other agents commonly used for saponification and dehydration, such as aqueous solutions of other mineral and organic acids, representative of which are phosphoric, hydrochloric, hydrobromic, formic, acetic, oxalic and alkyl and aryl sulfonic acids.

The reaction represented by the above Equation I will take place slowly at room temperature although it is accelerated by the addition of heat, but the temperature preferably is kept below 100° C. The optimum temperature is around 65° C. and at this temperature the reaction should continue for at least an hour to obtain appreciable yields, but maximum yields are obtained at about 24 hrs. At lower or higher temperatures the reaction will require respectively a longer or a shorter time. It is then partially neutralized with an alkali such as sodium hydroxide and the lactone is then extracted by a solvent such as ether or ethyl acetate. The lactone is recovered by withdrawal of the solvent, preferably under vacuum.

The invention will be clarified further by the following examples:

EXAMPLE I

Preparation from ethyl ester of 3-hydroxy-3-methyl-5-acetyloxypentanoic acid

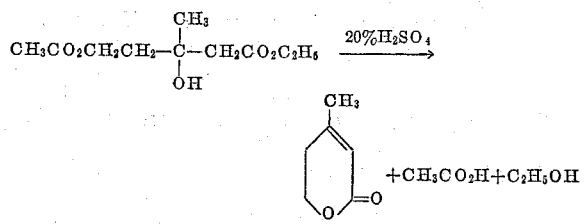

Ethyl 3-hydroxy-3-methyl-5-acetoxypentanoate, 50.0 g., was dissolved in 250 ml. of 20% sulfuric acid and the resulting solution stirred for 42 hr. at 65° C. This solution was partially neutralized by the addition of 500 ml. of 2.5 N sodium hydroxide, saturated with ammonium sulfate and extracted with three portions of ether. The ether solution was dried over magnesium sulfate and concentrated under reduced pressure. The residue was distilled giving 24.3 g. (94%) of 5-hydroxy-3-methyl-2-pentenoic acid δ-lactone, B.P. 88–89° at 1.6 mm., $n_D^{25}$ 1.4858, log $\epsilon$3.98 at $\lambda_{max}H_2O$ 222 m$\mu$; $\lambda_{max}CHCl_3$ 5.78$\mu$ ($c=o$), 6.07 (conj. $c=c$) and 11.60$\mu$ (>C=CH).

*Analysis.*—Calcd. for $C_6H_8O_2$ (112.12); C, 64.27; H, 7.19. Found: C, 64.39; H, 7.39; sapn., equiv. 113.

The product failed to react with iodine bromide using the Hanus procedure thus confirming the 2-position for the double bond.

EXAMPLE II

Preparation from methyl ester of 3-hydroxy-3-methyl-5-propionoxypentanoic acid

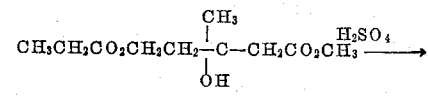

Methyl 3-hydroxy-3-methyl-5-propionoxypentanoate, 19.2 g., was dissolved in 100 ml. of 20% (by volume) sulfuric acid and kept in a stoppered flask for 40 hrs. at 65° C. The solution was cooled in ice and adjusted to ca. pH 3 by the addition of 2.5 N sodium hydroxide. This aqueous solution was saturated with ammonium sulfate and extracted with four portions of ethyl acetate which were combined and dried over magnesium sulfate. The solution was filtered and the ethyl acetate was removed by concentration under reduced pressure leaving a liquid which was distilled giving 7.9 g. (80%), of 5-hydroxy-3-methyl-2-pentanoic acid lactone, B.P. 92° at 2 mm., $n_D^{25}$ 1.4860, $\lambda_{max}H_2O$ 222 m$\mu$ ($\epsilon$9,500).

*Analysis.*—Calcd. for $C_6H_8O_2$; C, 64.27; H, 7.19. Found: C, 63.78; H, 7.00.

Saponification equivalent calcd., 112. Found: 113.

EXAMPLE III

*Mevalonic acid from 5-hydroxy-3-methyl-2-pentanoic acid δ-lactone*

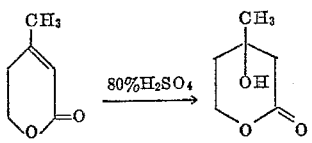

5-hydroxy-3-methyl-2-pentanoic acid δ-lactone, 5.0 g., was cooled in an ice bath and stirred while 4.7 g. of 80% sulfuric acid was added slowly. The stirring was continued for two hours while the temperature was maintained at 5–10°. The mixture was then poured onto cracked ice. An equivalent amount of barium chloride was added and the barium sulfate removed by filtration. The aqueous filtrate was diluted with water and lyophilized. Two portions of 100 percent ethanol were added and evaporated under reduced pressure. The residue was extracted with three portions of chloroform. The combined extracts were evaporated under reduced pressure. The residual oil contained DL-mevalonic acid but to further purify it the following procedure was carried out.

The oil was dissolved in 70 ml. of water and 5.35 g. of N,N′-dibenzylethylenediamine in 100 ml. of methanol was added. The solution was kept at room temperature overnight. The methanol was evaporated under reduced pressure and the aqueous solution was extracted with three portions of ether. The aqueous solution was evaporated under reduced pressure giving an oil. This oil was crystallized from methanol-ether giving crystalline material melting at 123–125°. Recrystallization gave material whose melting point, 125–127°, was not depressed when mixed with N,N′-dibenzylethylenediammonium bis-(DL-mevalonate). The infrared spectra of the product was identical with that of N,N′-dibenzylethylene diammonium bis-(DL-mevalonate). Pure DL-mevalonic acid was obtained by passing an aqueous solution of the product through a column of Amberlite IR–120 (H$^+$). The eluate was lyophilized. The DL-mevalonic acid thus obtained had the same microbiological activity as an authentic sample with the Lactobacillus acidiphilus strain ATCC 4963 described in the article by H. R. Skeggs et al., appearing in J. Bact., 72, 519 (1956).

What is claimed is:
1. The process for producing the lactone:

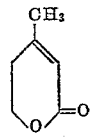

which comprises mixing together a lower alkyl ester of 3-hydroxy-3-methyl-5-lower alkanoyloxypentanoic acid with an acidic olefin producing dehydrating agent, and recovering the lactone.

2. The process according to claim 1 in which the dehydrating agent is dilute sulfuric acid.

References Cited in the file of this patent

Haynes: Quarterly Reviews, vol. II, p. 47 (1948).
Elderfield: "Heterocyclic Compounds," vol. 1, p. 357 (John Wiley and Sons, Inc., N.Y.), 1950.
Wolf et al.: Journ. of the Amer. Chem. Soc., vol. 79, pp. 1486–7 (1957).